United States Patent
Mori et al.

(10) Patent No.: US 6,666,090 B2
(45) Date of Patent: Dec. 23, 2003

(54) VIBRATING GYROSCOPE AND ELECTRONIC DEVICE USING THE SAME

(75) Inventors: Akira Mori, Nagaokakyo (JP); Akira Kumada, Otsu (JP); Kazuhiro Ebara, Yasu-gun (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/888,678

(22) Filed: Jun. 25, 2001

(65) Prior Publication Data

US 2002/0017135 A1 Feb. 14, 2002

(30) Foreign Application Priority Data

Jun. 27, 2000 (JP) ......................................... 2000-192950

(51) Int. Cl.[7] ............................................... G01C 19/00
(52) U.S. Cl. ...................................... 73/504.02; 73/1.77
(58) Field of Search ............................. 73/488, 504.02, 73/504.12, 1.77, 1.82

(56) References Cited

FOREIGN PATENT DOCUMENTS

| JP | 4215017 | 8/1992 | |
|---|---|---|---|
| JP | 406018267 A | * 1/1994 | .............. 73/504.12 |
| JP | 9281138 | 10/1997 | |

* cited by examiner

Primary Examiner—Richard A. Moller
(74) Attorney, Agent, or Firm—Keating & Bennett, LLP

(57) ABSTRACT

A vibrating gyroscope includes a vibrator having a driving electrode and a sensor electrode, a driving circuit for applying a driving voltage to the driving electrode, a detection circuit which receives, from the sensor electrode, a signal corresponding to a bending displacement of the vibrator, a signal processing circuit for processing a signal input from the detection circuit to detect an angular velocity, a power supply circuit, and a diagnostic circuit for examining whether or not the detection circuit, the driving circuit, the signal processing circuit, and the power supply circuit are all functioning normally.

21 Claims, 10 Drawing Sheets

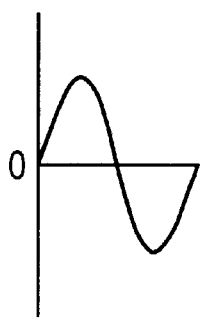
SENSOR CIRCUIT OUTPUT SIGNAL
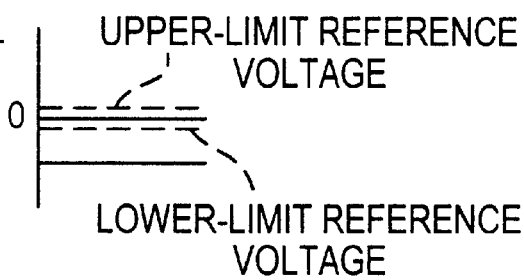
RECTIFIER CIRCUIT OUTPUT SIGNAL
UPPER-LIMIT REFERENCE VOLTAGE
LOWER-LIMIT REFERENCE VOLTAGE
FIG. 3
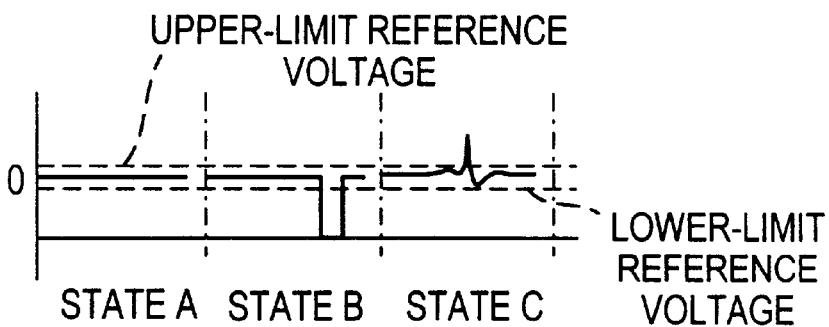
POWER SUPPLY CIRCUIT OUTPUT SIGNAL
UPPER-LIMIT REFERENCE VOLTAGE
STATE A  STATE B  STATE C
LOWER-LIMIT REFERENCE VOLTAGE
FIG. 4

VIBRATING GYROSCOPE AND ELECTRONIC DEVICE USING THE SAME

BACKGROUND OF THE INVENTION

1. Field of the Invention

The present invention generally relates to a vibrating gyroscope and an electronic device using the same. More particularly, the present invention relates to a vibrating gyroscope for use in electronic devices such as video cameras having an anti-shake function, car navigation systems, and pointing devices, and to an electronic device using the same.

2. Description of the Related Art

FIG. 13 is a block diagram of a conventional vibrating gyroscope 50. The basic concept of the vibrating gyroscope 50 shown in FIG. 13 is disclosed in Japanese Unexamined Patent Application Publication No. 4-215017.

Referring to FIG. 13, the vibrating gyroscope 50 includes a vibrator 100, a sensor circuit 200, a driving circuit 300, a signal processing circuit 400, and a diagnostic circuit 700.

The vibrator 100 includes a first piezoelectric substrate 101, and a second piezoelectric substrate 102. The first piezoelectric substrate 101 has a first sensor electrode 104 and a second sensor electrode 105 on one principal plane thereof, and is polarized in the thickness direction. The second piezoelectric substrate 102 has a driving electrode 106 on one principal plane thereof, and is polarized in the thickness direction. The other principal plane of the first piezoelectric substrate 101 and the other principal plane of the second piezoelectric substrate 102 are bonded via an intermediate electrode 103. The sensor circuit 200 includes a first charge amp 220, a second charge amp 221, and a differential circuit 210. The driving circuit 300 includes an adder circuit 310, an automatic gain control (AGC) circuit 320, and a phase correction circuit 330. The signal processing circuit 400 includes a detector circuit 410, a smoothing circuit 420, and an amplifier circuit 430.

In the vibrating gyroscope 50 having such a structure, the first and second sensor electrodes 104 and 105 of the vibrator 100 are connected to the first and second charge amps 220 and 221, respectively. Each of the first and second charge amps 220 and 221 is connected to the adder circuit 310 and the differential circuit 210. The adder circuit 310 is connected to the AGC circuit 320, and the AGC circuit 320 is connected to the phase correction circuit 330. The phase correction circuit 330 is then connected to the driving electrode 106, the detector circuit 410, and a diagnostic circuit 700. The differential circuit 210 is connected to the detector circuit 410 and the diagnostic circuit 700. The detector circuit 410 is connected to the smoothing circuit 420, and the smoothing circuit 420 is connected to the amplifier circuit 430.

In operation, by applying a driving voltage to the driving electrode 106, the vibrator 100 undergoes flexural vibration in the thickness direction with the longitudinal ends free. When an angular velocity whose axis extends in the longitudinal direction is applied to the vibrator 100, the Coriolis force causes a bending displacement in the width direction. Hence, signals having the same phase, which are caused by the driving voltage, and charges having different phases are generated at the first and second sensor electrodes 104 and 105 according to the Coriolis force.

The first charge amp 220 converts the charge generated at the first sensor electrode 104 into a voltage, which is then input to the differential circuit 210 and the adder circuit 310. The second charge amp 221 converts the charge generated at the second sensor electrode 105 into a voltage, which is then input to the differential circuit 210 and the adder circuit 310. The adder circuit 310 adds the input signals so that the action of the Coriolis force maybe eliminated from the signals, and outputs the resulting signal to the AGC circuit 320. The AGC circuit 320 amplifies the received signal to provide a fixed amplitude, and inputs the result to the phase correction circuit 330. The phase correction circuit 330 corrects the phase of the input signal before inputting the driving voltage to the driving electrode 106 and the detector circuit 410.

The differential circuit 210 subtracts the input signals so that the signal corresponding to the driving signal may be removed from the signals, and inputs the signal corresponding to the Coriolis force to the detector circuit 410. The detector circuit 410 detects the input signal from the differential circuit 210 in synchronization with the driving voltage, and inputs the result to the smoothing circuit 420. The smoothing circuit 420 smoothes the input signal, and inputs it to the amplifier circuit 430, and the amplifier circuit 430 direct-current amplifies the input signal to output a signal corresponding to the angular velocity to the outside.

Since the sensor circuit 200 and the driving circuit 300 are connected to the diagnostic circuit 700 in the vibrating gyroscope 50, it can be determined whether or not both the sensor circuit 200 and the driving circuit 300 are functioning normally, or whether or not at least one of the sensor circuit 200 and the driving circuit 300 is functioning abnormally.

The conventional vibrating gyroscope 50 includes the diagnostic circuit 700 which is connected to the sensor circuit 200 and the driving circuit 300, and it is possible to determine whether or not the sensor circuit 200 and/or the driving circuit 300 are functioning normally.

Phenomena which arises as a result of abnormality of the differential circuit 210 and the phase correction circuit 330 can also be determined. For example, it can be determined whether or not there are defects such as breakage, degradation, and connection failure in the first sensor electrode 104, the second sensor electrode 105, and the driving electrode 106 of the vibrator 100, or whether or not a power supply line leading to the driving circuit 300 has been disconnected.

In the conventional vibrating gyroscope 50, however, only a part of the circuit components that can operate abnormally is monitored, and all abnormalities of the vibrating gyroscope 50 are not determined. In technologies such as vehicle-related technologies, since a variety of components interact with one another to establish a complex system, a small abnormality of one component may lead to fatal damage of the overall system. Therefore, it is desired that the presence of an abnormality of not only a part of a circuit but also all circuit components including a power supply be reliably determined.

However, since the diagnostic circuit 700 is not connected to the signal processing circuit 400 in the conventional vibrating gyroscope 50, abnormality of the signal processing circuit 400 cannot be examined. Thus, a problem occurs in that an incorrect angular velocity which is output due to an abnormality of the signal processing circuit 400 would not be recognized. Furthermore, since the vibrating gyroscope 50 does not allow abnormalities of a power supply to be examined, another problem occurs in that phenomena which do not arise as a result of abnormalities of the differential circuit 210 and the phase correction circuit 330, namely, variance in voltage values of the power supply, and incorrect angular velocity which is output due to failure such as noise or instantaneous stop of operation, would not be recognized.

SUMMARY OF THE INVENTION

Accordingly, it is an object of the present invention to provide a vibrating gyroscope capable of reliably examining abnormalities if some circuit components are not functioning normally.

It is another object of the present invention to provide a vibrating gyroscope capable of reliably examining abnormalities if a power supply is not functioning normally.

It is still another object of the present invention to provide an electronic device having a reliable system implemented in a vibrating gyroscope capable of reliably examining abnormalities.

To this end, in one aspect of the present invention, a vibrating gyroscope includes a vibrator having a driving electrode and a sensor electrode, a driving circuit for applying a driving voltage to the driving electrode, a sensor circuit which receives, from the sensor electrode, a signal corresponding to a bending displacement of the vibrator, a signal processing circuit for processing a signal input from the sensor circuit to sense an angular velocity, and a diagnostic circuit for examining whether or not the sensor circuit, the driving circuit, and the signal processing circuit are all functioning normally.

Preferably, the signal processing circuit includes a switching device and a detector circuit. The switching device outputs to the detector circuit either a signal input from the sensor circuit or a signal input from the driving circuit. The detector circuit detects a signal input from the switching device in synchronization with the driving voltage. In response to an input of the signal from the sensor circuit through the switching device, the signal processing circuit may sense an angular velocity. In response to an input of the signal from the driving circuit through the switching device, the signal processing circuit may output the signal indicating whether or not the signal processing circuit has an abnormality.

The diagnostic circuit may include a first determination unit for comparing an input power supply voltage with a reference voltage to determine whether or not the power supply voltage falls within a predetermined range.

The diagnostic circuit may further include a first rectifier circuit for rectifying a signal input from the sensor circuit, a second rectifier circuit for rectifying a signal input from the driving circuit, an adder circuit for adding the signal rectified by the first rectifier circuit and the signal rectified by the second rectifier circuit, and a second determination unit for determining whether or not the resultant signal from the adder circuit falls within a predetermined range.

In another aspect of the present invention, an electronic device includes a vibrating gyroscope having any of the foregoing structures.

Therefore, the vibrating gyroscope has the ability to examine whether or not all of the circuits as well as the power supply have an abnormality, thus providing a reliable examination of abnormalities if some of the circuit components or the power supply is not functioning normally.

Furthermore, the vibrating gyroscope allows the presence of abnormalities to be determined after the sensor circuit output signal and the driving circuit output signal are added, making it possible to reduce the number of comparators used therein, thereby providing simplification of circuitry.

The vibrating gyroscope includes a switching device, and has a structure such that the presence of abnormalities is checked only when an examination of abnormalities is required, thereby providing simplification of circuitry.

An electronic device according to the present invention includes a vibrating gyroscope capable of reliably detecting abnormalities, thereby providing a system required for desired reliability.

Other features and advantages of the present invention will become apparent from the following description of the invention which refers to the accompanying drawings.

BRIEF DESCRIPTION OF THE DRAWING(S)

FIG. 3 is an operational waveform diagram of the vibrating gyroscope shown in FIG. 1;

FIG. 4 is another operational waveform diagram of the vibrating gyroscope shown in FIG. 1;

DETAILED DESCRIPTION OF EMBODIMENTS OF THE INVENTION

Figure 1:
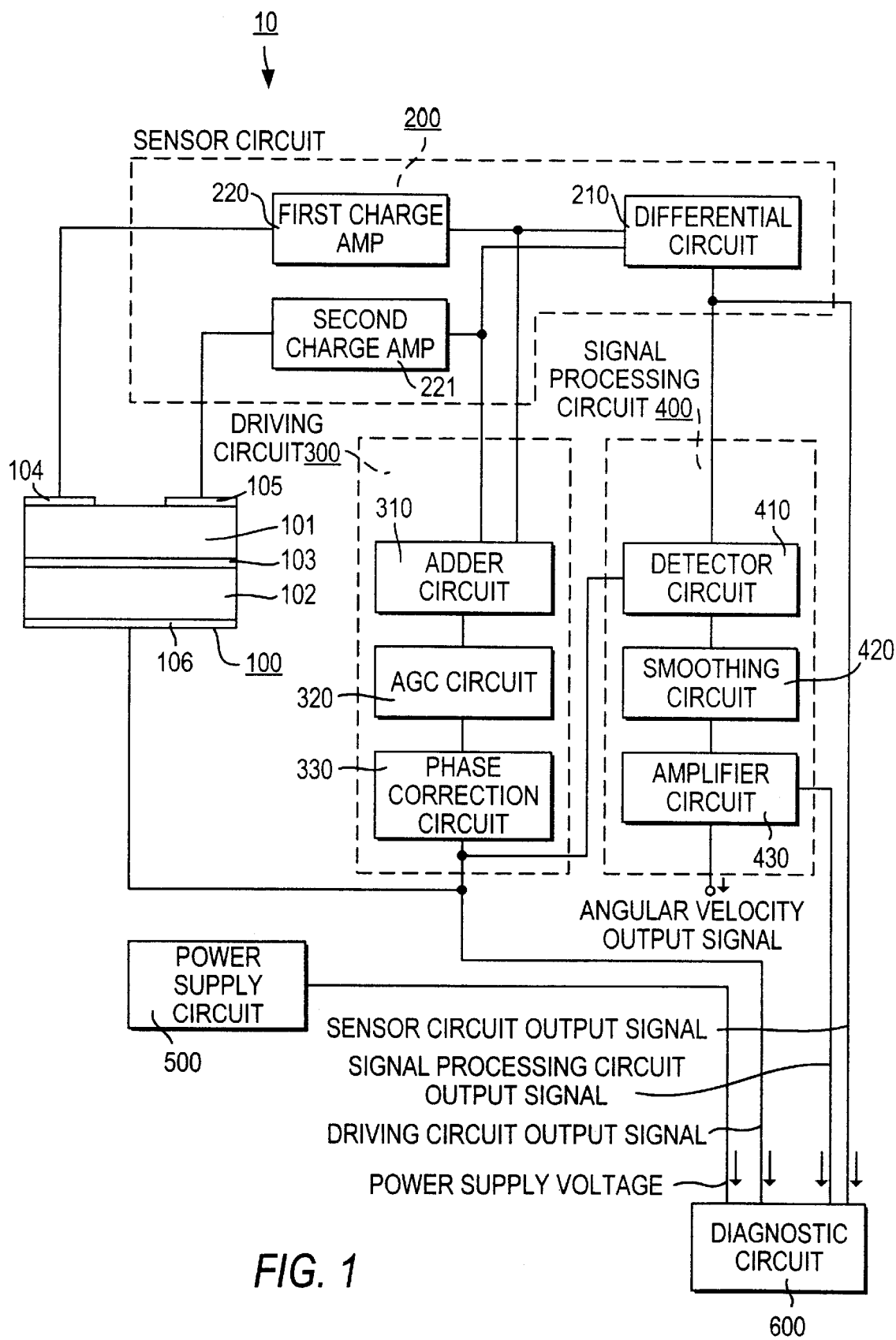
FIG. 1 is a block diagram of a vibrating gyroscope according to one embodiment of the present invention.

FIG. 1 is a block diagram of a vibrating gyroscope 10 according to one embodiment of the present invention. In FIG. 1, the same reference numerals are assigned to components of the vibrating gyroscope 10 which are identical or equivalent to those of the conventional vibrating gyroscope 50 shown in FIG. 13, and a description thereof is therefore omitted.

Figure 13:
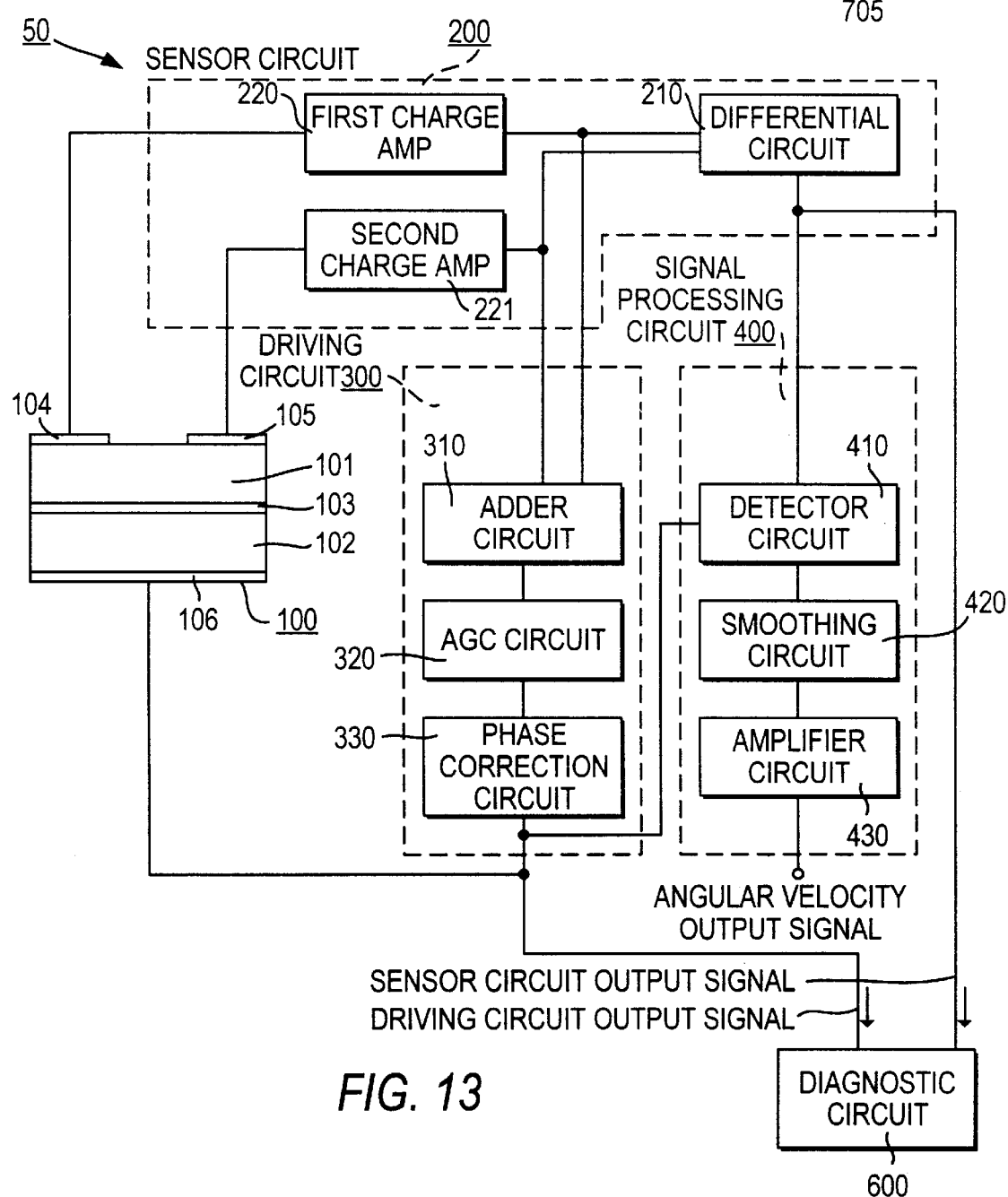
FIG. 13 is a block diagram of a conventional vibrating gyroscope.

Referring to FIG. 1, the vibrating gyroscope 10 includes a diagnostic circuit 600 in place of the diagnostic circuit 700 shown in FIG. 13. The diagnostic circuit 600 is connected to the differential circuit 210 in the sensor circuit 200, the phase correction circuit 330 in the driving circuit 300, the amplifier circuit 430 in the signal processing circuit 400, and a power supply circuit 500.

Figure 2:
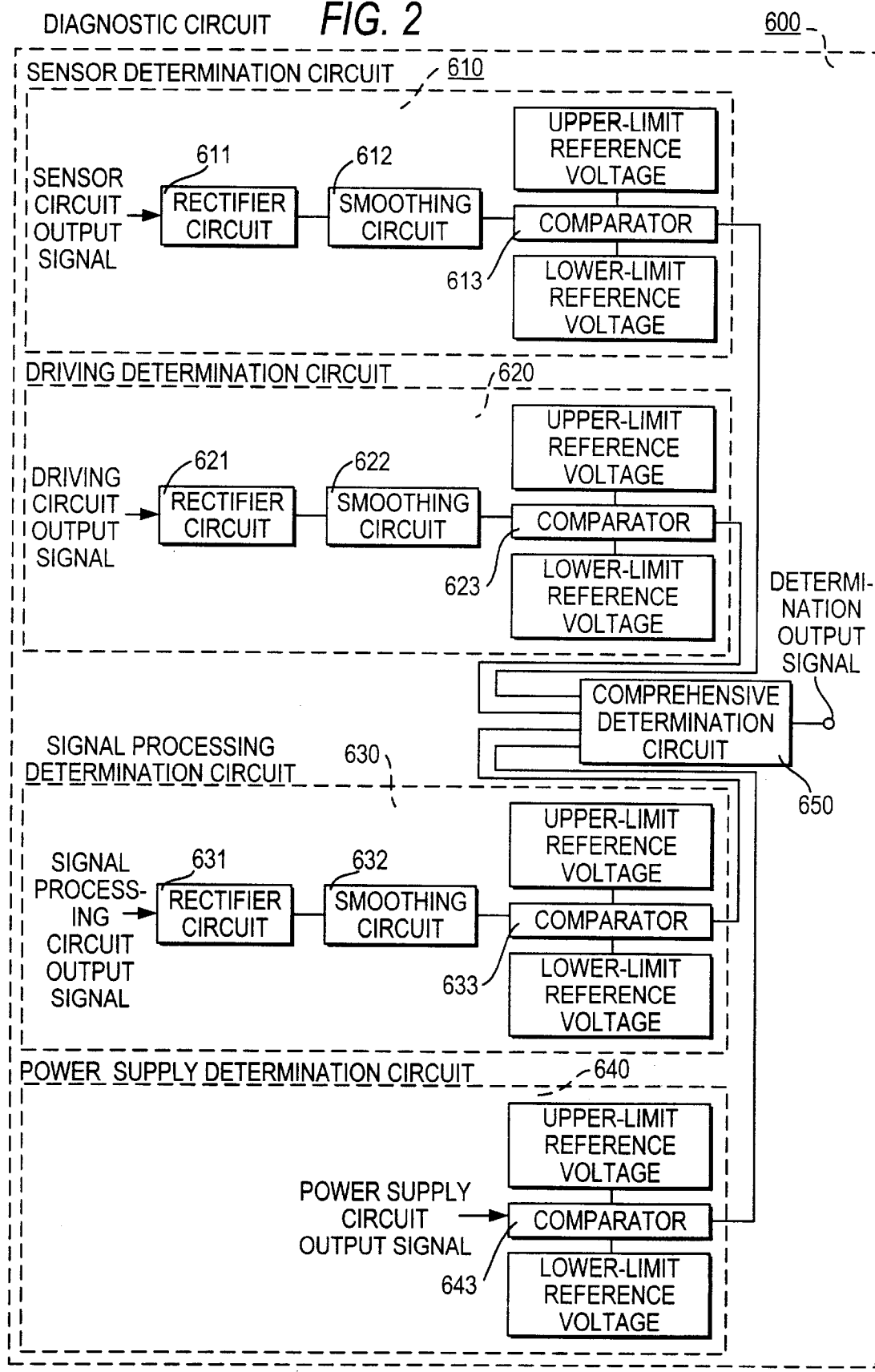
FIG. 2 is a block diagram of an enlargement of a diagnostic circuit in the vibrating gyroscope shown in FIG. 1.

FIG. 2 is an enlarged view of the diagnostic circuit 600. Referring to FIG. 2, the diagnostic circuit 600 includes a sensor determination circuit 610, a driving determination circuit 620, a signal processing determination circuit 630, a power supply determination circuit 640, and a comprehensive determination circuit 650.

The sensor determination circuit 610 includes a rectifier circuit 611, a smoothing circuit 612, and a comparator 613.

The driving determination circuit 620 includes a rectifier circuit 621, a smoothing circuit 622, and a comparator 623. The signal processing determination circuit 630 includes a rectifier circuit 631, a smoothing circuit 632, and a comparator 633. The power supply determination circuit 640 includes a comparator 643. The comprehensive determination circuit 650 is connected to the sensor determination circuit 610, the driving determination circuit 620, the signal processing determination circuit 630, and the power supply determination circuit 640.

The sensor determination circuit 610 is described with reference to FIG. 3. FIG. 3 depicts the sensor circuit output signal output from the sensor circuit 200, and the rectifier circuit output signal output from the smoothing circuit 612. It will be noted that the driving determination circuit 620 and the signal processing determination circuit 630 have the same circuitry and the same features as those of the sensor determination circuit 610, and a description thereof is therefore omitted.

In the sensor determination circuit 610, the rectifier circuit 611 is connected to the smoothing circuit 612, the smoothing circuit 612 is connected to the comparator 613, and the comparator 613 is connected to the comprehensive determination circuit 650. The rectifier circuit 611 receives the sensor circuit output signal output from the differential circuit 210 of the sensor circuit 200. The sensor circuit output signal contains information regarding whether or not the sensor circuit 200 has an abnormality. The rectifier circuit 611 full-wave rectifies the sensor circuit output signal and outputs the result to the smoothing circuit 612, and the smoothing circuit 612 smoothes the input signal and inputs it to the comparator 613. If the input signal is not less than the lower-limit reference voltage and is not more than the upper-limit reference voltage, the comparator 613 inputs to the comprehensive determination circuit 650 the determination result indicating that the sensor circuit 200 has no abnormality. On the other hand, if the input signal is below the lower-limit reference voltage or is above the upper-limit reference voltage, the comparator 613 inputs to the comprehensive determination circuit 650 the determination result indicating that the sensor circuit 200 has an abnormality.

For example, the output of the differential circuit 210 will be significantly low during a normal operation, and will be significantly high during an abnormal operation, e.g., when the second charge amp 221 is out of order. In this regard, if the signal input to the comparator 613 is not more than the upper-limit reference voltage, the comparator 613 may input to the comprehensive determination circuit 650 the determination result indicating that the sensor circuit 200 is functioning normally, without utilizing the lower-limit reference voltage. Alternatively, the smoothing circuit 612 may be removed if it is not necessary.

The power supply determination circuit 640 is described with reference to FIG. 4. FIG. 4 depicts the power supply circuit output signal output from the power supply circuit 500. In FIG. 4, state A indicates that the power supply voltage is normal, state B indicates an abnormal condition where the power supply voltage is instantaneously stopped, and state C indicates an abnormal condition where noise is applied to the power supply voltage.

In the power supply determination circuit 640, the comparator 643 is connected to the comprehensive determination circuit 650. The power supply circuit 500 receives the power supply circuit output signal which contains information regarding whether or not the power supply 500 has an abnormality. When the received signal is not less than the lower-limit reference voltage and is not more than the upper-limit reference voltage, the comparator 643 inputs to the comprehensive determination circuit 650 the determination result indicating that the power supply circuit 500 has no abnormality. On the other hand, if the received signal is below the lower-limit reference voltage or is above the upper-limit reference voltage, the comparator 643 inputs to the comprehensive determination circuit 650 the determination result indicating that the power supply circuit 500 has an abnormality. Typically, an abnormality of the power supply which continues for a very short period, such as in state B or C shown in FIG. 4, does not tend to be verified as abnormality at the sensor circuit 200 or the driving circuit 300. However, use of the comparator 643 allows for a reliable examination of abnormalities.

If the signals input from the sensor determination circuit 610, the driving determination circuit 620, the signal processing determination circuit 630, and the power supply determination circuit 640 are all normal, the comprehensive determination circuit 650 then determines that the circuit components as well as the power supply are all functioning normally. Otherwise, i.e., if at least one of the input signals is abnormal, the comprehensive determination circuit 650 then determines that the circuit components and the power supply are not functioning normally.

As will be understood by those skilled in the art, the sensor circuit output signal is not limited to the signal output from the differential circuit 210, but may be a signal output directly from the first or second charge amp 220 or 221. The driving circuit output signal is not limited to the signal output from the phase correction circuit 330, but may be a signal output directly from the adder circuit 310 or the AGC circuit 320. The signal processing circuit output signal is not limited to the signal output from the amplifier circuit 430, but may be a signal output directly from the detector circuit 410 or the smoothing circuit 420.

Accordingly, the vibrating gyroscope 10 has the ability to examine abnormalities of all circuit components, thus providing a reliable examination of abnormalities if some circuit components are not functioning abnormally.

The vibrating gyroscope 10 also has the ability to directly examine a power supply circuit using a power supply determination circuit, thereby providing a reliable examination of abnormalities in the vibrating gyroscope 10.

Figure 5:
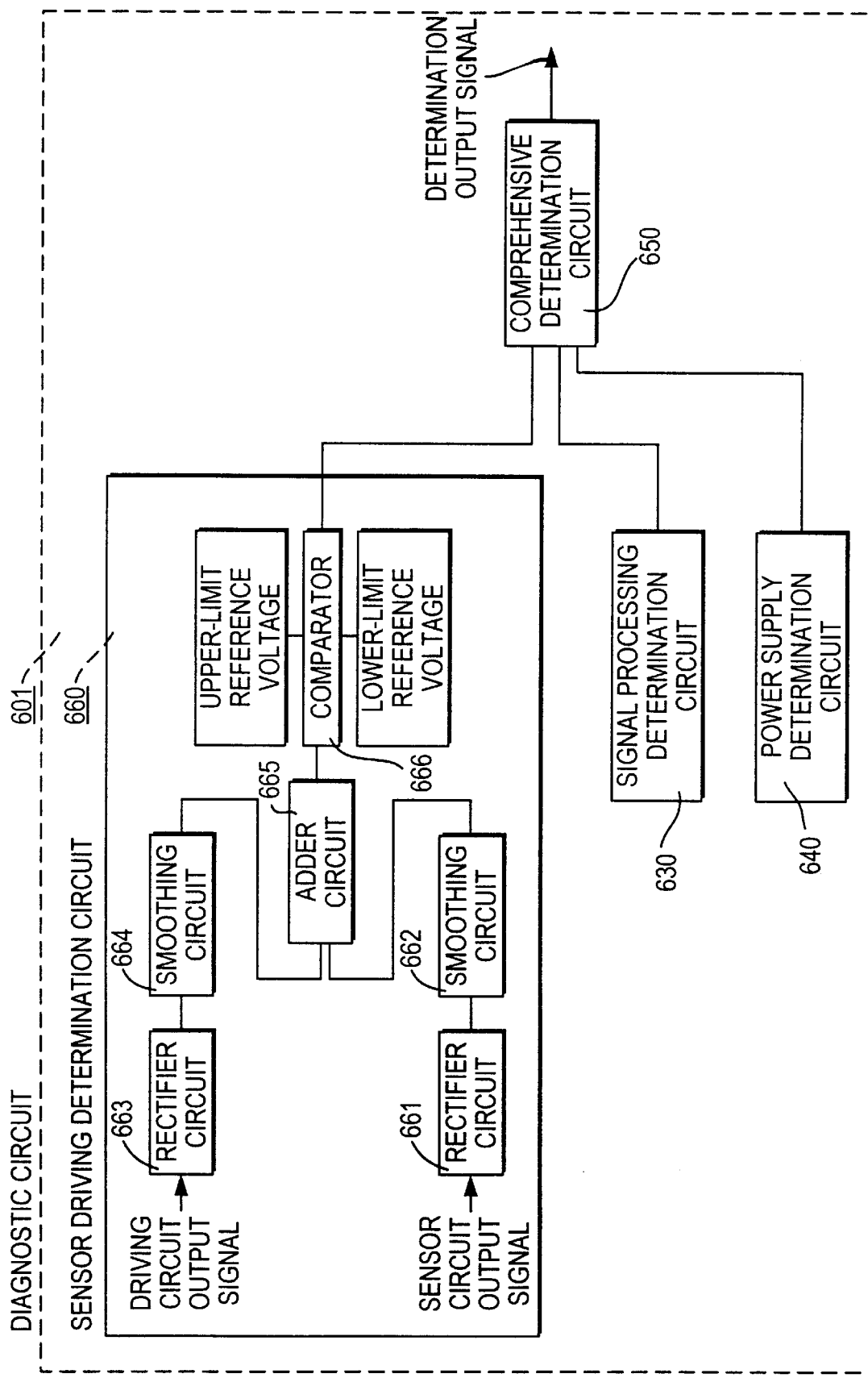
FIG. 5 is a block diagram of another diagnostic circuit in the vibrating gyroscope shown in FIG. 1.

FIG. 5 illustrates a modified diagnostic circuit 601 in the vibrating gyroscope according to the present invention. In FIG. 5, the same reference numerals are assigned to components of the diagnostic circuit 601 which are identical or equivalent to those of the diagnostic circuit 600 in the vibrating gyroscope 10 shown in FIG. 2, and a description thereof is therefore omitted.

Referring to FIG. 5, the diagnostic circuit 601 in the vibrating gyroscope 10 includes a sensor/driving determination circuit 660, in place of the sensor determination circuit 610 and the driving determination circuit 620 of the diagnosis circuit 600 shown in FIG. 2. The sensor/driving determination circuit 660 includes rectifier circuits 661 and 663, smoothing circuits 662 and 664, an adder circuit 665, and a comparator 666. The rectifier circuit 661 is connected to the sensor circuit 200 and the smoothing circuit 662, and the rectifier circuit 663 is connected to the driving circuit 630 and the smoothing circuit 664. The smoothing circuits 662 and 664 are connected to the adder circuit 665, and the adder circuit 665 is connected to the comparator 666. The rectifier circuit 661 full-wave rectifies the sensor circuit output signal, and outputs the result to the smoothing circuit 662, while the rectifier circuit 663 full-wave rectifies the driving circuit output signal in the direction opposite to the rectifier circuit 661, and outputs the result to the smoothing circuit 664. The smoothing circuits 662 and 664 smooth the received signals and output them to the adder circuit 665, and the adder circuit 665 adds the input signals and outputs the result to the comparator 666. If the input signal is not less than the lower-limit reference voltage and is not more than the upper-limit reference voltage, the comparator 666 outputs to the comprehensive determination circuit 650 the determination result indicating that the sensor circuit 200 and the driving circuit 300 have no abnormality. On the other hand, if the input signal is below the lower-limit reference voltage or is above the upper-limit reference voltage, the comparator 666 outputs to the comprehensive determination circuit 650 the determination result indicating that the sensor circuit 200 and the driving circuit 300 have an abnormality.

Figure 6:
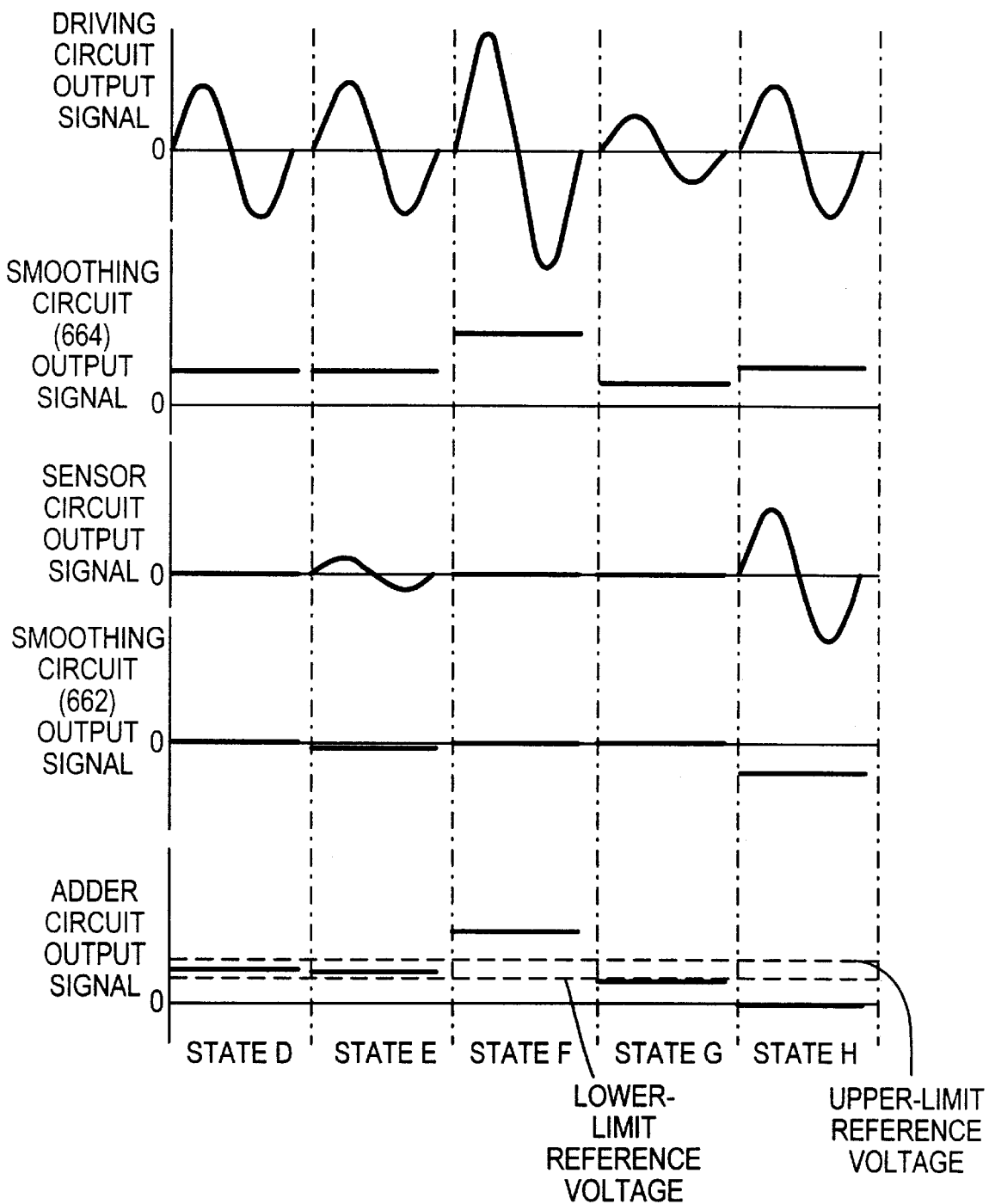
FIG. 6 is another operational waveform diagram of the vibrating gyroscope shown in FIG. 1.

FIG. 6 is a waveform diagram of the sensor/driving determination circuit 660, in which states D and E indicate a normal condition and states F, G and H indicate an abnormal condition.

The state D is a state where no angular velocity is applied. In the state D, a driving circuit output signal having a predetermined magnitude is input to the rectifier circuit 663, and a signal having a predetermined magnitude is output to the adder circuit 665 through the smoothing circuit 664. A sensor circuit output signal of 0 V is input to the rectifier circuit 661, and a signal of 0 V is output to the adder circuit 665 through the smoothing circuit 662. The adder circuit 665 adds the signals input from the smoothing circuits 664 and 662, and inputs the result to the comparator 666. Then, the comparator 666 determines that the resulting signal from the adder circuit 665 is not less than the lower-limit reference voltage and is not more than the upper-limit reference voltage.

State E is a state where an angular velocity is applied. State E is different from state D in that a signal according to the Coriolis force is applied to the rectifier circuit 661 from the sensor circuit 220, and is rectified in the direction opposite to the rectifier circuit 663. The resulting signal is smoothed by the smoothing circuit 662 and is passed to the adder circuit 665. Then, the comparator 666 determines that the resulting signal from the adder circuit 665 is not less than the lower-limit reference voltage and is not more than the upper-limit reference voltage.

State F is a state where the driving circuit output signal is excessively high. In state F, an excessively high signal is input to the rectifier circuit 663, and the excessively high signal is then passed to the adder circuit 665 through the smoothing circuit 664. Then, the comparator 666 determines that the resulting signal from the adder circuit 665 is above the upper-limit reference voltage.

State G is a state where the driving circuit output signal is excessively low. In state G, an excessively low driving circuit output signal is input to the rectifier circuit 663, and the excessively low signal is then passed to the adder circuit 665 through the smoothing circuit 664. Then, the comparator 666 determines that the resulting signal from the adder circuit 665 is not below the lower-limit reference voltage.

State H is a state where the sensor circuit output signal is excessively high. In state H, an excessively high signal is input to the rectifier circuit 661, and the excessively high signal is then passed to the adder circuit 665 through the smoothing circuit 662. Then, the comparator 666 determines that the resulting signal from the adder circuit 665 is below the lower-limit reference voltage.

Accordingly, with use of the adder circuit 665, the vibrating gyroscope 10 including the diagnostic circuit 601 reduces the number of comparators used therein, thereby providing simplification of circuitry.

For example, a vibrating gyroscope incorporated in a behavior control system for motor vehicles must examine abnormalities of all circuits, and it is sufficient that abnormality of some of the circuits be examined only at a specified time zone. For example, a sensor circuit and a driving circuit must be always examined with respect to the presence of abnormalities, while a signal processing circuit must be examined with respect to the presence of abnormalities only when the engine is actuated. In other words, a self diagnostic operation is performed according to importance of circuitry, thereby providing simplification of circuitry.

Figure 7:
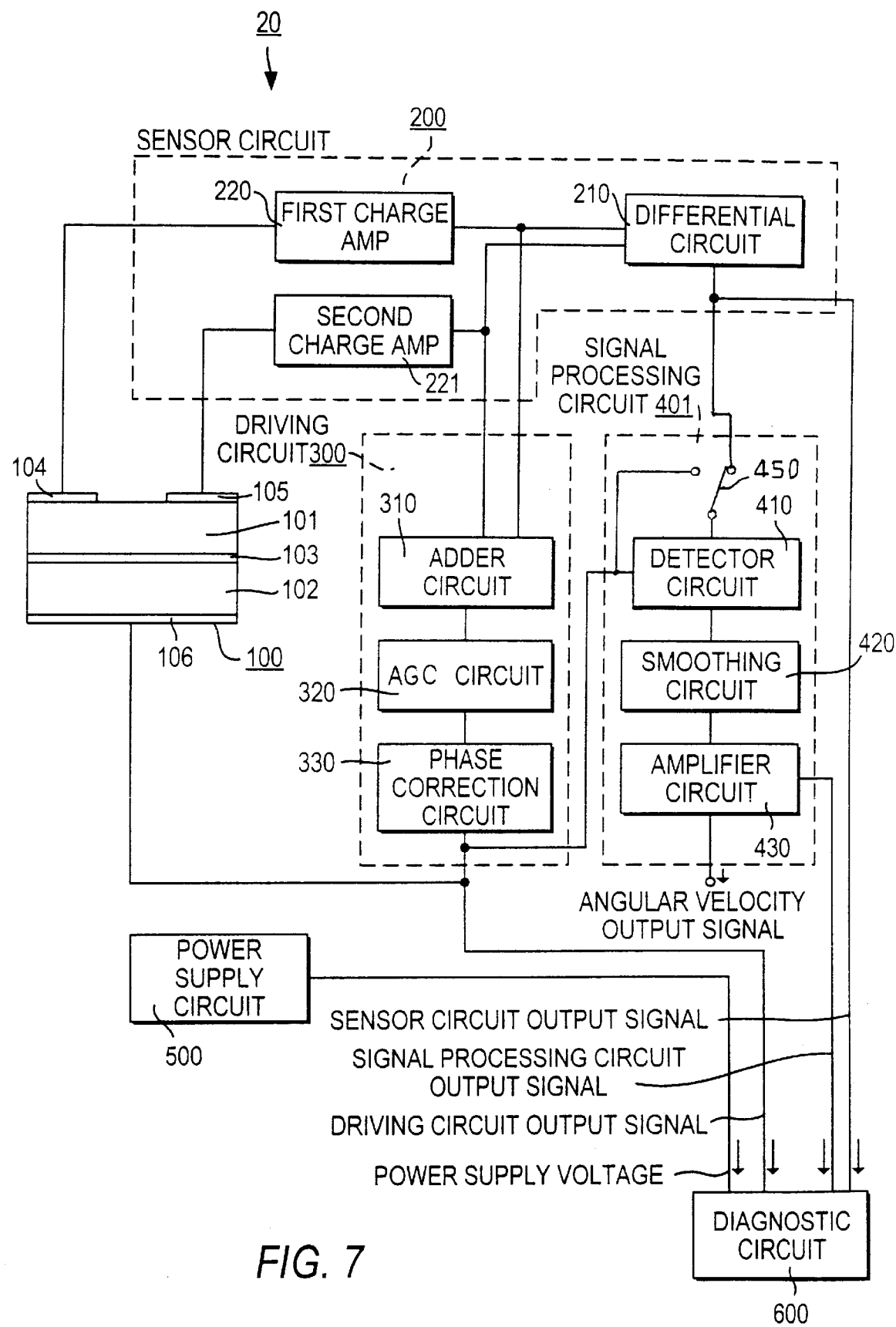
FIG. 7 is block diagram of a vibrating gyroscope according to another embodiment of the present invention.

FIG. 7 is a block diagram of a vibrating gyroscope 20 according to another embodiment of the present invention. In FIG. 7, the same reference numerals are assigned to components of the vibrating gyroscope 20 which are identical or equivalent to those of the vibrating gyroscope 10 shown in FIG. 1, and a description thereof is therefore omitted.

Referring to FIG. 7, the vibrating gyroscope 20 includes a signal processing circuit 401 in place of the signal processing circuit 400 in the vibrating gyroscope 10 shown in FIG. 1. The signal processing circuit 401 is different from the signal processing circuit 400 in that it further includes a switching device 450. The switching device 450 inputs to the detector circuit 410 either the signal input from the differential circuit 210, namely, the sensor circuit output signal, or the signal input from the phase correction circuit 330, namely, the driving circuit output signal. The detector circuit 410 detects the signal input from the switching device 450 in synchronization with the driving voltage, and outputs the result to the smoothing circuit 420. The smoothing circuit 420 smoothes the input signal and inputs it to the amplifier circuit 430, and the amplifier circuit 430 direct-current amplifies the input signal, and outputs the result to the outside.

Figure 8:
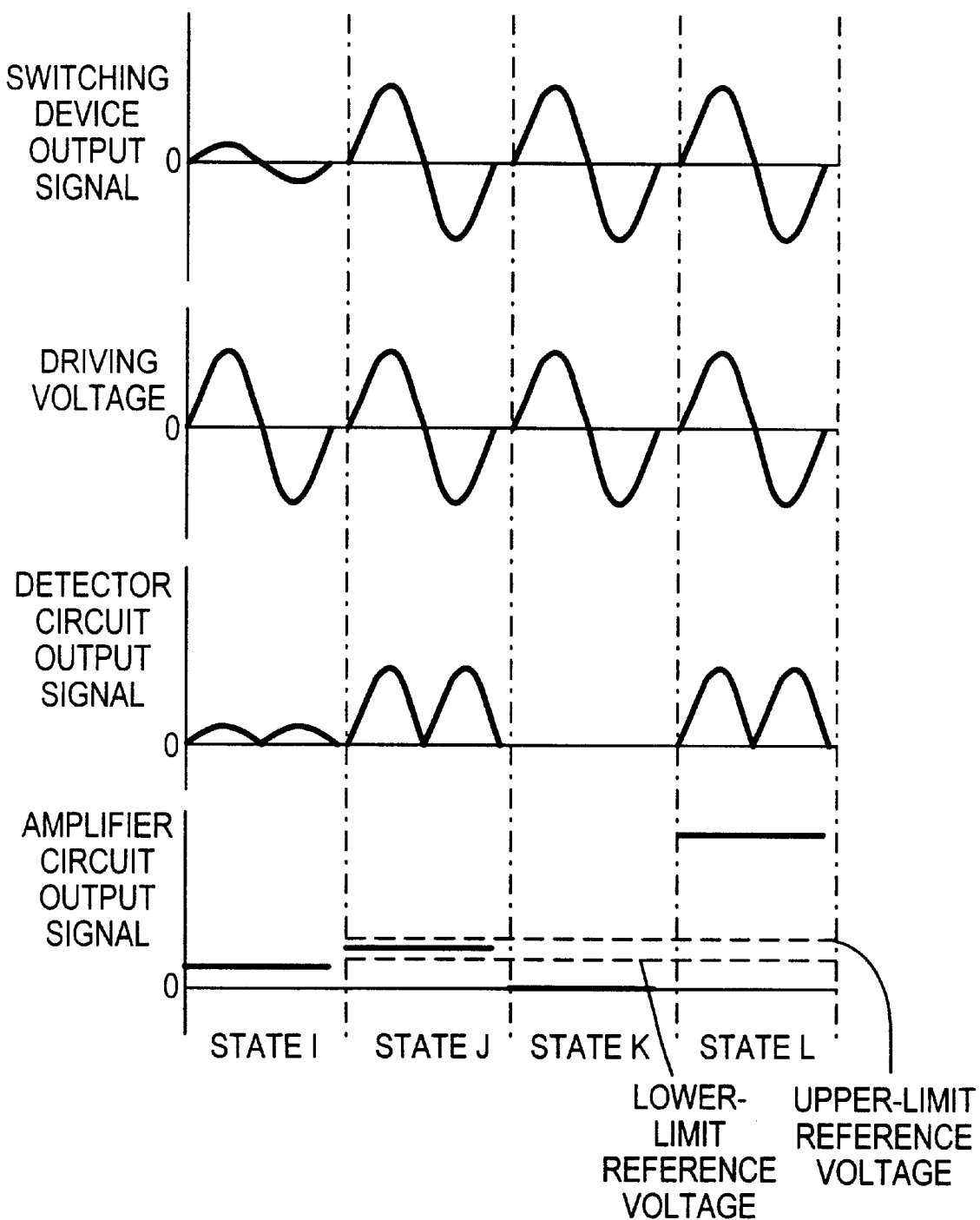
FIG. 8 is an operational waveform diagram of the vibrating gyroscope shown in FIG. 7.

FIG. 8 is a waveform diagram of the signal processing circuit 401 in the vibrating gyroscope 20. In FIG. 8, state I indicates that the switching device 450 is connected to the differential circuit 210, where a signal corresponding to the angular velocity is output from the amplifier circuit 430. States J, K, and L indicate that the switching device 450 is connected to the phase correction circuit 330, where a signal indicating whether or not the signal processing circuit 401 has an abnormality is input to the diagnostic circuit 600 from the amplifier circuit 430. States I and J indicate a state where the signal processing circuit 401 has no abnormality, while states K and L indicate a state where the signal processing circuit 401 has an abnormality.

Instate I, the signal input from the differential circuit 210 is input to the detector circuit 410 through the switching device 450. In sequence, the input signal is detected by the detector circuit 450, is smoothed by the smoothing circuit 420, and is amplified by the amplifier circuit 430 to output a signal corresponding to the angular velocity.

In states J, K, and L, the signal input from the phase correction circuit 330 is input to the detector circuit 410 through the switching device 450. In sequence, the input signal is detected by the detector circuit 410, is smoothed by the smoothing circuit 420, and is amplified by the amplifier circuit 430. Then, the signal processing determination circuit 630 in the diagnostic circuit 600 determines whether or not the signal processing circuit 401 has an abnormality. For example, in state J, the signal input from the amplifier circuit 430 to the diagnostic circuit 660 is not less than the lower-limit reference voltage and is not more than the upper-limit reference voltage, leading to determination that the signal processing circuit 401 has no abnormality. In state K, the detector circuit output signal indicates 0 V because the detector circuit 410 is functioning abnormally, and the voltage input from the amplifier circuit 430 to the diagnostic circuit 600 is below the lower-limit reference voltage, leading to determination that the signal processing circuit 401 has an abnormality. In state L, the amplification magnitude of the amplifier circuit 430 is excessively high, and the voltage output from the amplifier circuit 430 is above the upper-limit reference voltage, leading to determination that the signal processing circuit 401 has an abnormality.

Accordingly, with use of the switching device 450, the vibrating gyroscope 20 is designed so that the presence of abnormality of the signal processing circuit 401 is examined only when such an examination of abnormality is required, thereby providing simplification of circuitry.

Figure 9:
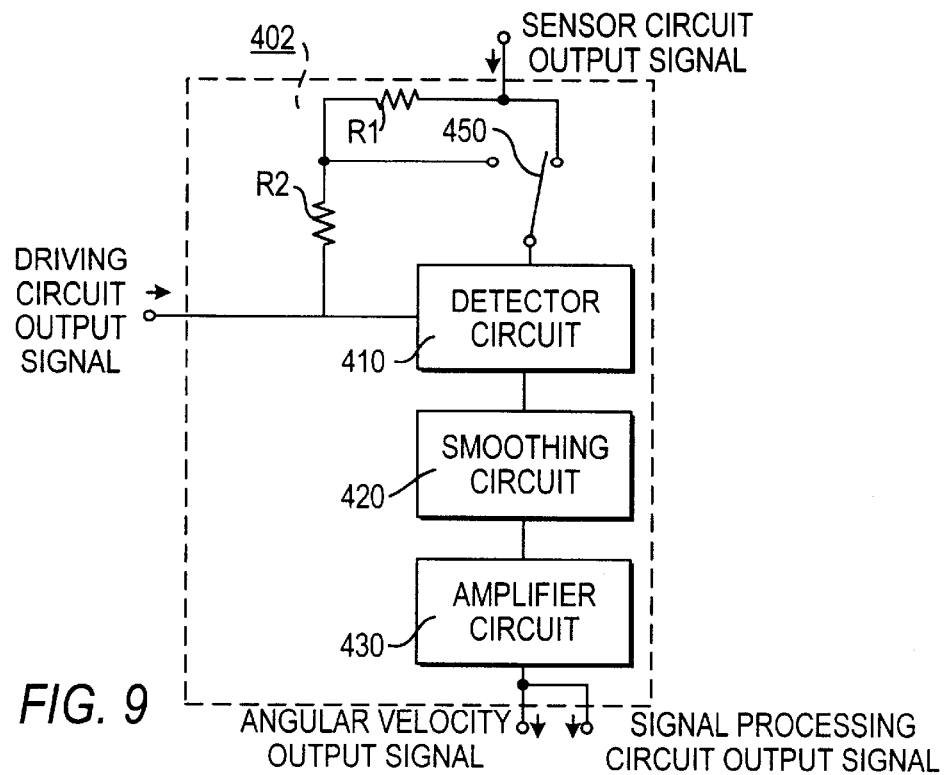
FIG. 9 is a block diagram of another signal processing circuit in the vibrating gyroscope shown in FIG. 7.

FIG. 9 illustrates a modified signal processing circuit 402 in the vibrating gyroscope 20 according to the present invention. In FIG. 9, the same reference numerals are assigned to components of the signal processing circuit 402 which are identical or equivalent to those of the signal processing circuit 401 in the vibrating gyroscope 20 shown in FIG. 7, and a description thereof is therefore omitted.

Referring to FIG. 9, the signal processing circuit 402 further includes resistors R1 and R2 in addition to the components of the signal processing circuit 401 shown in FIG. 7. One end of the resistor R1 is connected to a first input terminal of the switching device 450 which receives the sensor circuit output signal, and the other end is connected to a second input terminal of the switching device 450 which receives the driving circuit output signal. One end of the resistor R2 is connected to the second input terminal of the switching device 450, and the other end is connected to the driving circuit 300.

With this structure, by sufficiently increasing the resistances of the resistors R1 and R2, the signal processing circuit 402 performs the same functions as those of the signal processing circuit 401.

Figure 10:
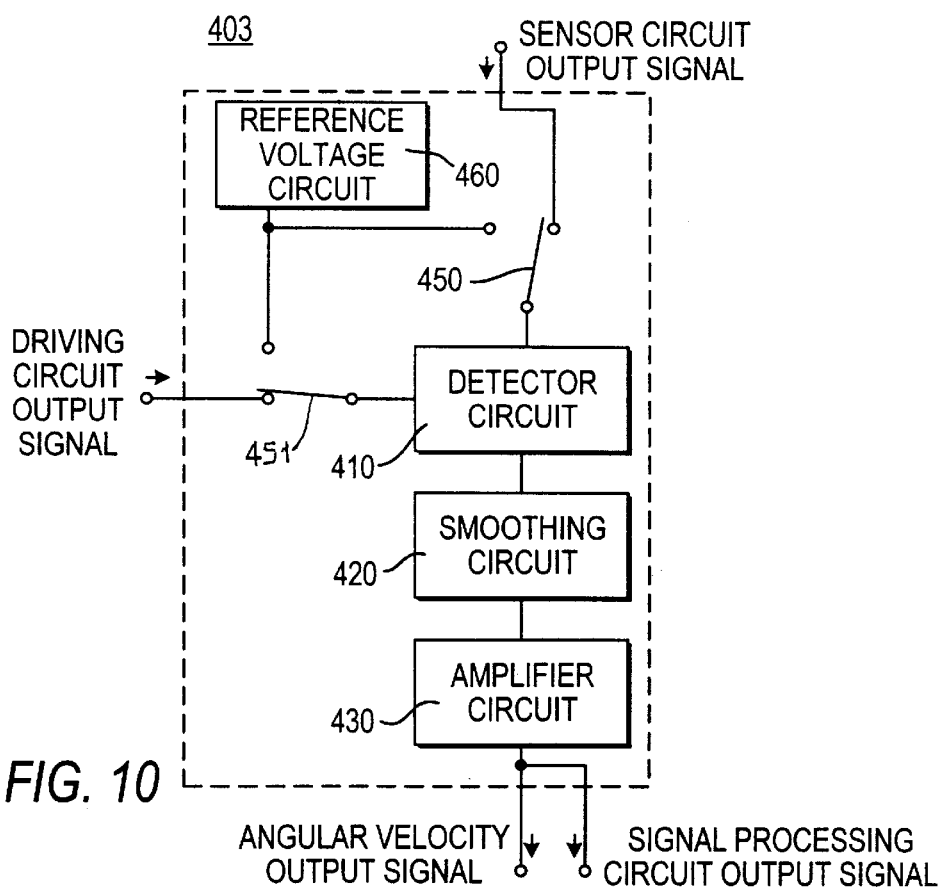
FIG. 10 is a block diagram of another signal processing circuit in the vibrating gyroscope shown in FIG. 7.

FIG. 10 illustrates another modified signal processing circuit 403 in the vibrating gyroscope 20 according to the present invention. In FIG. 10, the same reference numerals are assigned to components of the signal processing circuit 403 which are identical or equivalent to those of the signal processing circuit 401 in the vibrating gyroscope 20 shown in FIG. 7, and a description thereof is therefore omitted.

Referring to FIG. 10, the signal processing circuit 403 further includes a reference voltage circuit 460 and a switching device 451 in addition to the components of the signal processing circuit 401 shown in FIG. 7. The reference voltage circuit 460 outputs a predetermined constant voltage. The switching device 450 inputs to the detector circuit 410 either the sensor circuit output signal or the signal output from the reference voltage circuit 460. The switching device 451 inputs to the detector circuit 410 either the signal output from the reference voltage circuit 460 or the driving circuit output signal. When the sensor circuit output signal is input to the detector circuit 410 by the switching device 450, the switching device 451 inputs the driving circuit output signal to the detector circuit 410. When the signal output from the reference voltage circuit 460 is input to the detector circuit 410, on the other hand, the switching device 451 inputs the signal output from the reference voltage circuit 460 to the detector circuit 410.

Accordingly, in the signal processing circuit 403, when the sensor circuit output signal is input to the detector circuit 410, the angular velocity is output. When the signal output from the reference voltage circuit 460 is input to the detector circuit 410, the signal output from the reference voltage circuit 460 is used to detect the signal output from the reference voltage circuit 460. Therefore, the signal output from the reference voltage circuit 460 is smoothed by the smoothing circuit 420, and the signal amplified by the amplifier circuit 430 is output while the detector circuit 410 does not operate. That is, the diagnostic operation is performed on the amplification magnitude of the amplifier circuit 430.

Figure 11:
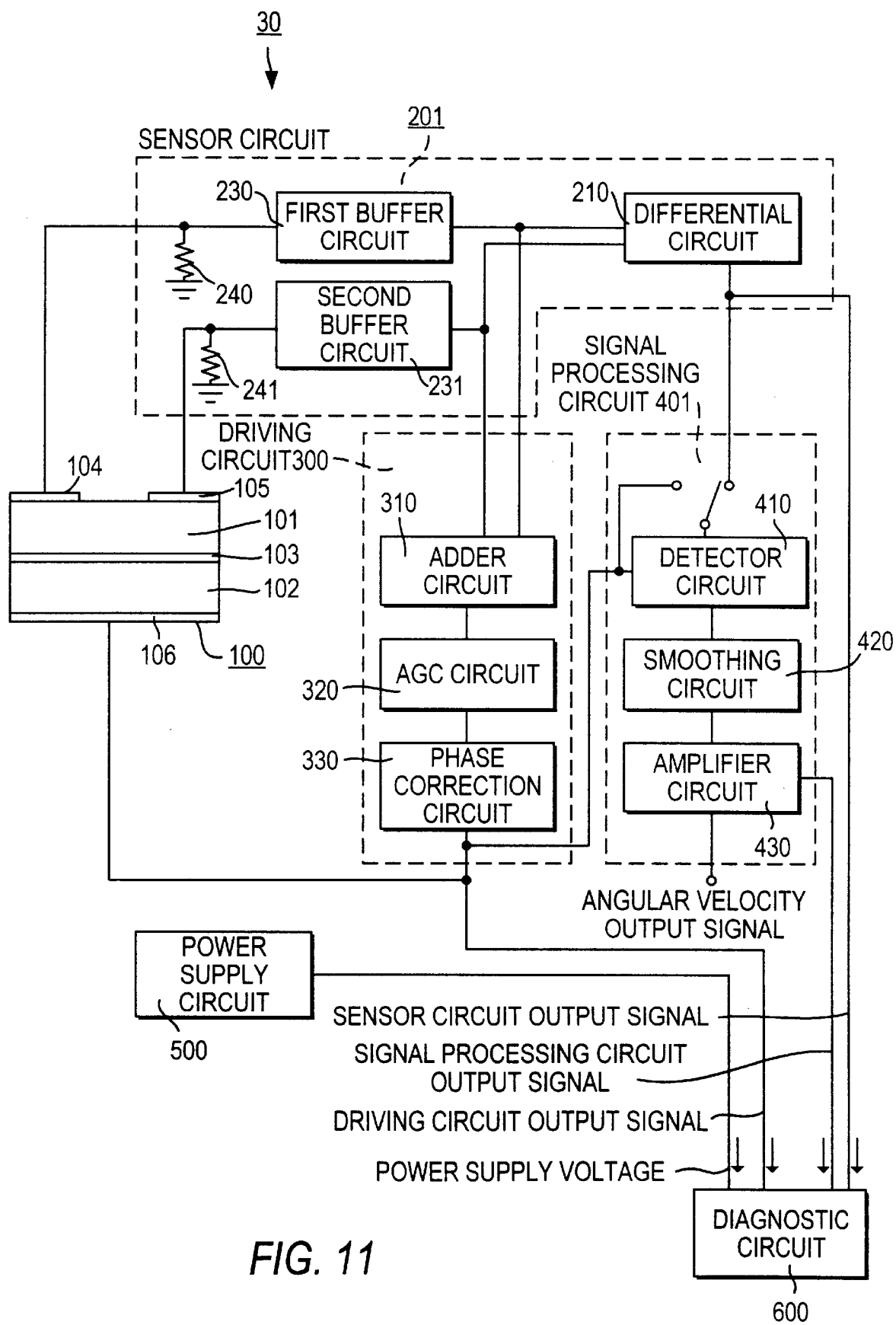
FIG. 11 is a block diagram of a vibrating gyroscope according to another embodiment of the present invention.

FIG. 11 illustrates a vibrating gyroscope 30 according to another embodiment of the present invention. In FIG. 11, the same reference numerals are assigned to components of the vibrating gyroscope 30 which are identical or equivalent to those of the vibrating gyroscope 20 shown in FIG. 7, and a description thereof is therefore omitted.

Referring to FIG. 11, in the vibrating gyroscope 30, the sensor circuit 201 includes a first buffer circuit 230, a second buffer circuit 231, and resistors 240 and 241, in place of the first charge amp 220 and the second charge amp 221 of the sensor circuit 200 in the vibrating gyroscope 20 shown in FIG. 7.

The first buffer circuit 230 and the resistor 240 are connected to the first sensor electrode 104, and the second buffer circuit 231 and the resistor 241 are connected to the second sensor electrode 105. Each of the first and second buffer circuits 230 and 231 is connected to the adder circuit 310 and the differential circuit 210. The first buffer circuit 230 distributes the voltage of the first sensor electrode 104 to the adder circuit 310 and the differential circuit 210, and the second buffer circuit 231 distributes the voltage of the second sensor electrode 105 to the adder circuit 310 and the differential circuit 210. The resistors 240 and 241 are used to adjust the impedance of the first sensor electrode 104 and the second sensor electrode 105, respectively.

With this structure, the vibrating gyroscope 30 having the detection circuit 201 also performs the same functions as those of the vibrating gyroscope 20.

The illustrated embodiments have been described with respect to the vibrator implemented in a bimorph vibrator having two piezoelectric substrates bonded together; however, the vibrator may be implemented in a vibrator of the tuning bar type which is cylindrical or is shaped into a triangular block, or a vibrator of the tuning fork type. Of course, the sensor circuit, the driving circuit, the signal processing circuit, and the diagnostic circuit of the present invention are not limited to those in the illustrated embodiments.

Figure 12:
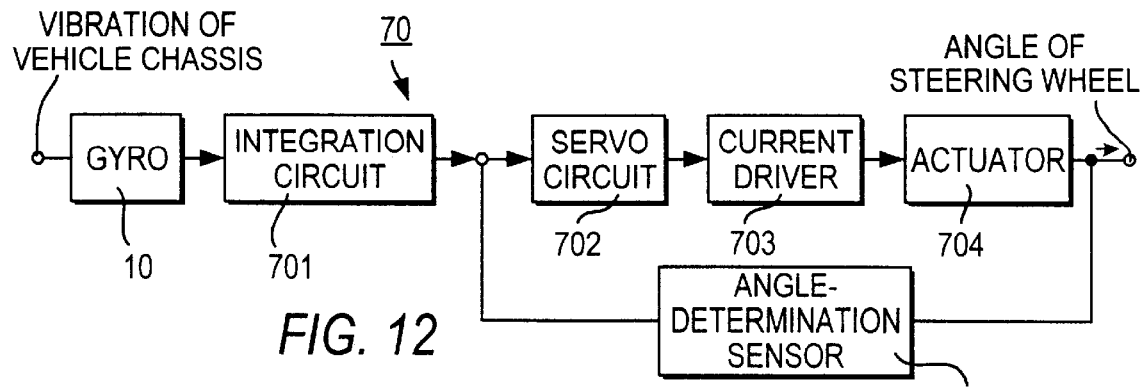
FIG. 12 is a block diagram of an autodriving circuit example for use in an electronic device according to the present invention.

FIG. 12 illustrates an electronic device example incorporating a vibrator in accordance with the present invention. FIG. 12 is a block diagram of an autodriving circuit 70 for use in motor vehicles, which embodies an electronic device of the present invention by way of example.

The autodriving circuit 70 includes the vibrating gyroscope 10 in accordance with the present invention, an integration circuit 701, a servo circuit 702, a current driver 703, an actuator 704, and an angle-determination sensor 705. In the autodriving circuit 70, the vibrating gyroscope 10, the servo circuit 702, the current driver 703, and the actuator 704 are connected in series, and the output of the actuator 704 loops back to the servo circuit 702 through the angle-determination sensor 705.

In operation, only an angular velocity signal in vibration of a vehicle chassis is input to the integration circuit 701 through the vibrating gyroscope 10. The integration circuit 701 performs an integration on the angular velocity signal to convert it to the angle at which the chassis vibrates, and outputs the result to the servo circuit 702. The servo circuit 702 uses the input signals of angular velocity from the integration circuit 701 and the angle-determination sensor 705 to calculate the difference between the current value and the target value, and outputs the result to the current driver 703. The current driver 703 outputs an electric current according to the input signal to the actuator 704, thereby allowing the actuator 704 to mechanically drive the steering wheel of the motor vehicle. The angle-determination sensor 705 outputs the angle at which the steering wheel rotates to the servo circuit 702.

With this structure, an electronic device having the auto-driving circuit 70 according to the present invention includes a vibrating gyroscope capable of reliably detecting abnormalities, thereby providing a reliable system which results in a large-scale system required for desired reliability.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrating gyroscope comprising:
   a vibrator having a driving electrode and a sensor electrode;
   a driving circuit for applying a driving voltage to the driving electrode;
   a sensor circuit which receives a signal corresponding to a bending displacement of said vibrator from the sensor electrode;
   a signal processing circuit for processing a signal input from said sensor circuit to sense an angular velocity; and
   a diagnostic circuit responsive to signals from said driving circuit, said sensor circuit, and said signal processing circuit for determining if said driving circuit, said sensor circuit, and said signal processing circuit are all functioning normally.

2. A vibrating gyroscope according to claim 1, wherein said signal processing circuit includes:
   a switching device;
   a detector;
   the switching device being arranged to output to said detector one of a signal input from said sensor circuit and a signal input from said driving circuit; and
   the detector being arranged to detect the signal input from the switching device in synchronization with the driving voltage; wherein
   said signal processing circuit senses an angular velocity when the signal is input from said sensor circuit through the switching device, and outputs a signal indicating if said signal processing circuit has an abnormality when the signal is input from said driving circuit through the switching device.

3. A vibrating gyroscope according to claim 2, wherein the signal processing circuit further includes first and second resistors; wherein
   one end of the first resistor is connected to a first input terminal of the switching device, which receives the signal input from the sensor circuit, and the other end of the first resistor is connected to the second input terminal of the switching device, which receives the signal input from the driving circuit, and one end of the second resistor is connected to the second input terminal of the switching device and the other end of the second resistor is connected to the driving circuit.

4. A vibrating gyroscope according to claim 1, wherein said diagnostic circuit further includes:
   a first rectifier circuit for rectifying a signal input from said sensor circuit;
   a second rectifier circuit for rectifying a signal input from said driving circuit;
   an adder circuit for adding the signal rectified by said first rectifier circuit and the signal rectified by said second rectifier circuit; and
   a first determination unit for determining if the resultant signal from said adder circuit falls within a predetermined range.

5. A vibrating gyroscope according to claim 4, wherein said diagnostic circuit includes a second determination unit for comparing an input power supply voltage with a reference voltage to determine if the input power supply voltage falls within a predetermined range.

6. A vibrating gyroscope according to claim 1, wherein said diagnostic circuit includes:
   a sensor determination circuit for determining if said sensor circuit is functioning normally;
   a driving determination circuit for determining if said driving circuit is functioning normally;
   a signal processing determination circuit for determining whether said signal processing circuit is functioning normally;
   a power supply determination circuit for determining whether an input power supply voltage falls within a predetermined range; and
   a comprehensive determination circuit responsive to the sensor determination circuit, the driving determination circuit, the signal processing determination circuit, and the power supply determination circuit for outputting a signal indicating if the sensor determination circuit, the driving determination circuit, the signal processing determination circuit, or the power supply power determination circuit are functioning normally.

7. A vibrating gyroscope according to claim 6, wherein the sensor determination circuit includes:
   a first rectifier;
   a first smoothing circuit; and
   a first comparator; wherein
      the sensor circuit is connected to the first rectifier circuit, the first rectifier circuit is connected to the first smoothing circuit, the first smoothing circuit is connected to the first comparator, and the first comparator is connected to the comprehensive determination circuit.

8. A vibrating gyroscope according to claim 7, wherein the driving determination circuit includes;
   a second rectifier circuit;
   a second smoothing circuit; and
   a second comparator; wherein
      the driving circuit is connected to the second rectifier circuit, the second rectifier circuit is connected to the second smoothing circuit, the second smoothing circuit is connected to the second comparator, and the second comparator is connected to the comprehensive determination circuit.

9. A vibrating gyroscope according to claim 8, wherein the signal processing determination circuit includes:
   a third rectifier circuit;
   a third smoothing circuit; and
   a third comparator; wherein
      the signal processing circuit is connected to the third rectifier, the third rectifier circuit is connected to the third smoothing circuit, the third smoothing circuit is connected to the third comparator and the third comparator is connected to the comprehensive determination circuit.

10. A vibrating gyroscope according to claim 9, wherein the power supply determination circuit includes a fourth comparator for determining if the input power supply voltage falls within the predetermined ranges.

11. A vibrating gyroscope according to claim 6, wherein the driving determination circuit includes:
   a rectifier circuit;
   a smoothing circuit; and
   a comparator; wherein
      the driving circuit is connected to the rectifier circuit, the rectifier circuit is connected to the smoothing circuit, the smoothing circuit is connected to the comparator, and the comparator is connected to the comprehensive determination circuit.

12. A vibrating gyroscope according to claim 6, wherein the signal processing determination circuit includes;
   a rectifier circuit;
   a smoothing circuit; and
   a comparator; wherein
      the signal processing circuit is connected to the rectifier, the rectifier circuit is connected to the smoothing circuit, the smoothing circuit is connected to the comparator and the comparator is connected to the comprehensive determination circuit.

13. A vibrating gyroscope according to claim 1, wherein the diagnostic circuit further includes;
   a sensor/driving determination circuit, which includes:
      the sensor circuit;
      the driving circuit;
      first and second rectifier circuits;
      first and second smoothing circuits;
      an adder circuit; and
      a comparator; wherein
         the first rectifier circuit is connected to the sensor circuit and the first smoothing circuit, the second rectifier circuit is connected to the driving circuit and the second smoothing circuit, the first and second smoothing circuits are connected to the adder circuit, and the adder circuit is connected to the comparator.

14. A vibrating gyroscope according to claim 1, wherein said signal processing circuit includes:
   a detector;
   a reference voltage circuit; and
   first and second switching devices; wherein
      the reference voltage circuit outputs a predetermined constant voltage, the first switching device inputs to the detector a signal output from one of the sensor circuit and the reference voltage circuit, and the second switching device inputs to the detector a signal from one of the reference voltage circuit and the driving circuit.

15. An electronic device comprising:
   a vibrating gyroscope including:
      a vibrator having driving electrode and a sensor electrode;
      a driving circuit for applying a driving voltage to the driving electrode;
      a sensor circuit which receives a signal corresponding to a bending displacement of said vibrator from the sensor electrode;
      a signal processing circuit for processing a signal input from said sensor circuit to sense an angular velocity; and
      a diagnostic circuit responsive to signals from said driving circuit, said sensor circuit, and said signal processing circuit for determining if said driving circuit, said sensor circuit, and said signal processing circuit are all functioning normally.

16. An electronic device according to claim 15, wherein said signal processing circuit includes:
   a switching device;
   a detector;
   the switching device being arranged to output to said detector one of a signal input from said sensor circuit and a signal input from said driving circuit; and
   the detector being arranged to detect the signal input from the switching device in synchronization with the driving voltage; wherein
      said signal processing circuit senses an angular velocity when the signal is input from said sensor circuit through the switching device and outputs a signal indicating if said signal processing circuit has an abnormality when the signal is input from said driving circuit through the switching device.

17. An electronic device according to claim 16, wherein the signal processing circuit further includes first and second resistors; wherein
   one end of the first resistor is connected to a first input terminal of the switching device, which receives the signal input from the sensor circuit, and the other end of the first resistor is connected to a second input terminal of the switching device, which receives the signal input from the driving circuit, and one end of the second resistor is connected to the second input terminal of the switching device, which receives the signal input from the driving circuit, and the other end of the second resistor is connected to the driving circuit.

18. An electronic device according to claim 15, wherein said diagnostic circuit further includes:
   a first rectifier circuit for rectifying a signal input from said sensor circuit;
   a second rectifier circuit for rectifying a signal input from said driving circuit;
   an adder circuit for adding the signal rectified by said first rectifier circuit and the signal rectified by said second rectifier circuit; and
   a first determination unit for determining if the resultant signal from said adder circuit falls within a predetermined range.

19. An electronic device according to claim 18, wherein said diagnostic circuit includes a second determination unit for comparing an input power supply voltage with a reference voltage to determine if the input power supply voltage falls within a predetermined range.

20. An electronic device according to claim 15, wherein the diagnostic circuit includes:

a sensor determination circuit for determining if said sensor circuit is functioning normally;

a driving determination circuit for determining if said driving circuit is functioning normally;

a signal processing determination circuit for determining whether said signal processing circuit is functioning normally;

a power supply determination circuit for determining whether an input power supply voltage falls within a predetermined range; and a comprehensive determination circuit responsive to the sensor determination circuit, the driving determination circuit, the signal processing determination circuit, and the power supply determination circuit for outputting a signal indicating if the sensor determination circuit, the driving determination circuit, the signal processing determination circuit, or the power supply power determination circuit are functioning normally;

the sensor determination circuit includes:
  a first rectifier;
  a first smoothing circuit;
  a first comparator; and
  wherein the sensor circuit is connected to the first rectifier circuit, the first rectifier circuit is connected to the first smoothing circuit, the first smoothing circuit is connected to the first comparator, and the first comparator is connected to the comprehensive determination circuit;

the driving determination circuit includes:
  a second rectifier circuit;
  a second smoothing circuit;
  a second comparator; and
  wherein the driving circuit is connected to the second rectifier circuit, the second rectifier circuit is connected to the second smoothing circuit, the second smoothing circuit is connected to the second comparator, and the second comparator is connected to the comprehensive determination circuit;

the signal processing determination circuit includes:
  a third rectifier circuit;
  a third smoothing circuit;
  a third comparator; and
  the signal processing circuit is connected to the third rectifier, the third rectifier circuit is connected to the third smoothing circuit, the third smoothing circuit is connected to the third comparator and the third comparator is connected to the comprehensive determination circuit; and the power supply determination circuit includes a fourth comparator for determining if an input power supply voltage falls within a predetermined range.

21. An electronic device according to claim 15, wherein the diagnostic circuit further includes:

a sensor/driving determination circuit which includes:
  the sensor circuit;
  the driver circuit;
  first and second rectifier circuits;
  first and second smoothing circuits;
  an adder circuit; and
  a comparator; wherein
    the first rectifier circuit is connected to the first sensor circuit and the first smoothing circuit, the second rectifier circuit is connected to the driving circuit and the second smoothing circuit, and the first and second smoothing circuits are connected to the adder circuit, and the adder circuit is connected to the comparator.

* * * * *